United States Patent

[11] 3,584,420

| [72] | Inventor | John Robert Southland<br>Arcadia, Calif. |
|---|---|---|
| [21] | Appl. No. | 781,207 |
| [22] | Filed | Dec. 4, 1968 |
| [45] | Patented | June 15, 1971 |
| [73] | Assignee | Omark-Winslow Aerospace Tool Co.<br>Portland, Oreg. |

[54] APPARATUS FOR GRINDING CURVED LIP POINTS ON TWIST DRILLS
5 Claims, 7 Drawing Figs.

[52] U.S. Cl. .................................................. 51/94,
51/97, 51/219
[51] Int. Cl. .................................................. B24b 3/30
[50] Field of Search .................................. 51/94, 97, 219

[56] References Cited
UNITED STATES PATENTS

| 3,209,493 | 10/1965 | Houser | 51/94 |
|---|---|---|---|
| 3,239,966 | 3/1966 | Richardson | 51/219 X |
| 3,266,194 | 8/1966 | Winslow | 51/219 X |

*Primary Examiner*—Lester M. Swingle
*Attorney*—Forrest J. Lilly

ABSTRACT: A process and grinding machine for generating a curved lip drill point on a twist drill in which the drill is moved against the surface of a peripheral groove in a grinding wheel. This groove has a profile comprised of an arc and two straight lines tangent to opposite ends thereof. The drill point is repeatedly engaged with this surface.

INVENTOR.
JOHN ROBERT SOUTHLAND
BY Forrest J. Lilly
ATTORNEY

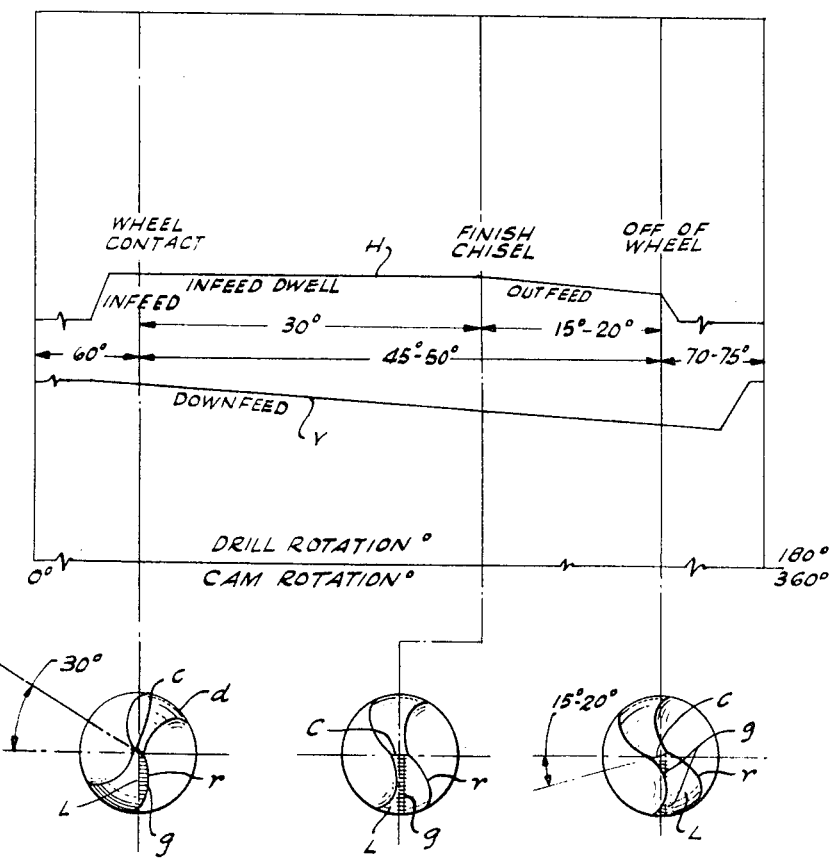
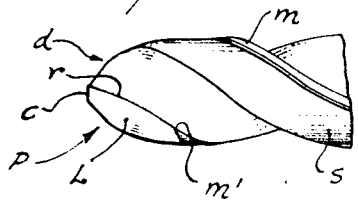
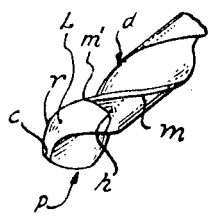
INVENTOR.
JOHN ROBERT SOUTHLAND
BY Forrest J. Lilly
ATTORNEY

PATENTED JUN 15 1971 3,584,420

INVENTOR.
JOHN ROBERT SOUTHLAND
BY Forrest J. Lilly
ATTORNEY

APPARATUS FOR GRINDING CURVED LIP POINTS ON TWIST DRILLS

FIELD OF THE INVENTION

This invention relates generally to twist drills and more particularly to the grinding of curved lip points on twist drills.

BACKGROUND OF THE INVENTION

Fluted twist drills with curved lip points may be described generally as characterized by a point whose cutting lips, the point surfaces which follow the lips and the trailing edges of these point surfaces, are defined (excepting for modifications to afford clearance) by a surface of revolution about the longitudinal axis of the drill. The generatrix of this surface is characterized by a curved line, usually an arc struck in a plane through the longitudinal axis of the drill from a center point that may be located either on or off the longitudinal axis of the drill. This arc may be tangent to the shank of the drill, or to its margin, but preferably the arc does not quite reach tangency at the juncture with the margin. At the other end, the arc is merged with the tip of the point, preferably using an intervening frustoconical segment. The has the usual "chisel edge," or some modification thereof. In effect, the usual peripheral shoulder of the lip of a conventional drill point is ground away, and the lip and the point surface following it redefined on a substantially arcuate curve which merges somewhat near to tangency with the so-called margin on the drill shank. Such a drill point requires deviation from the aforementioned "idealized" surface of revolution to afford a lip clearance angle or "relief" on the curved point surface in back of the lip, herein referred to as "axial relief." Also, since the curved cutting lip has a cutting action along its entire length, from the chisel edge at the tip to the point where it merges with the margin of the drill, the surface of the point in back of the lip must have "radial" clearance or relief as well. This means that the curved land in back of the curved lip must be ground with a relief angle as seen in a plane at right angles to the drill. A drill point of this general class is disclosed in U.S. Pat. No. 1,309,706.

Such drills have certain advantages in certain special materials or applications. Such points have been ground by skilled machinists using a suitable grinder. The operation, however, requires a highly skilled machinist, and a truly precision curved lip drill point is virtually impossible of attainment by such a process. Machine grinders for producing such drill points have now appeared. To the extent of my knowledge, they involve a manually operated machine making successive grinds against a flat grinding wheel surface.

The purpose of the present invention is to provide an improved pointing machine capable of automatically generating an improved precision curved lip drill point.

SUMMARY OF THE INVENTION

According to the invention, speaking generally, a curved lip drill point is generated by passing it repeatedly against, along the profile of, and then away from, a generally arcuate grinding surface on a grinding wheel. The arcuate grinding surface, in the preferred illustrative embodiment of the invention, is joined at each end by a straight tangential region, and the lip of the point first engages angularly against one of these and against the arcuate region, and is then rotated and so moved relative thereto as to grind the point, with both axial and radial clearances. Towards the end of each grinding "pass," the drill point is moved so that its tip, which is already finished, is taken out of engagement with the grinding surface, while grinding continues on the region of the junction of the base of the point with the shank, to continue the grinding of radial clearance in that region in the final part of the operation.

BRIEF DESCRIPTION OF THE DRAWINGS

FIG. 2 is a timing diagram;

FIGS. 6 and 7 are a side elevational and a perspective view, respectively, of a curved lip drill point.

DESCRIPTION OF A PREFERRED EMBODIMENT

Figure 1:
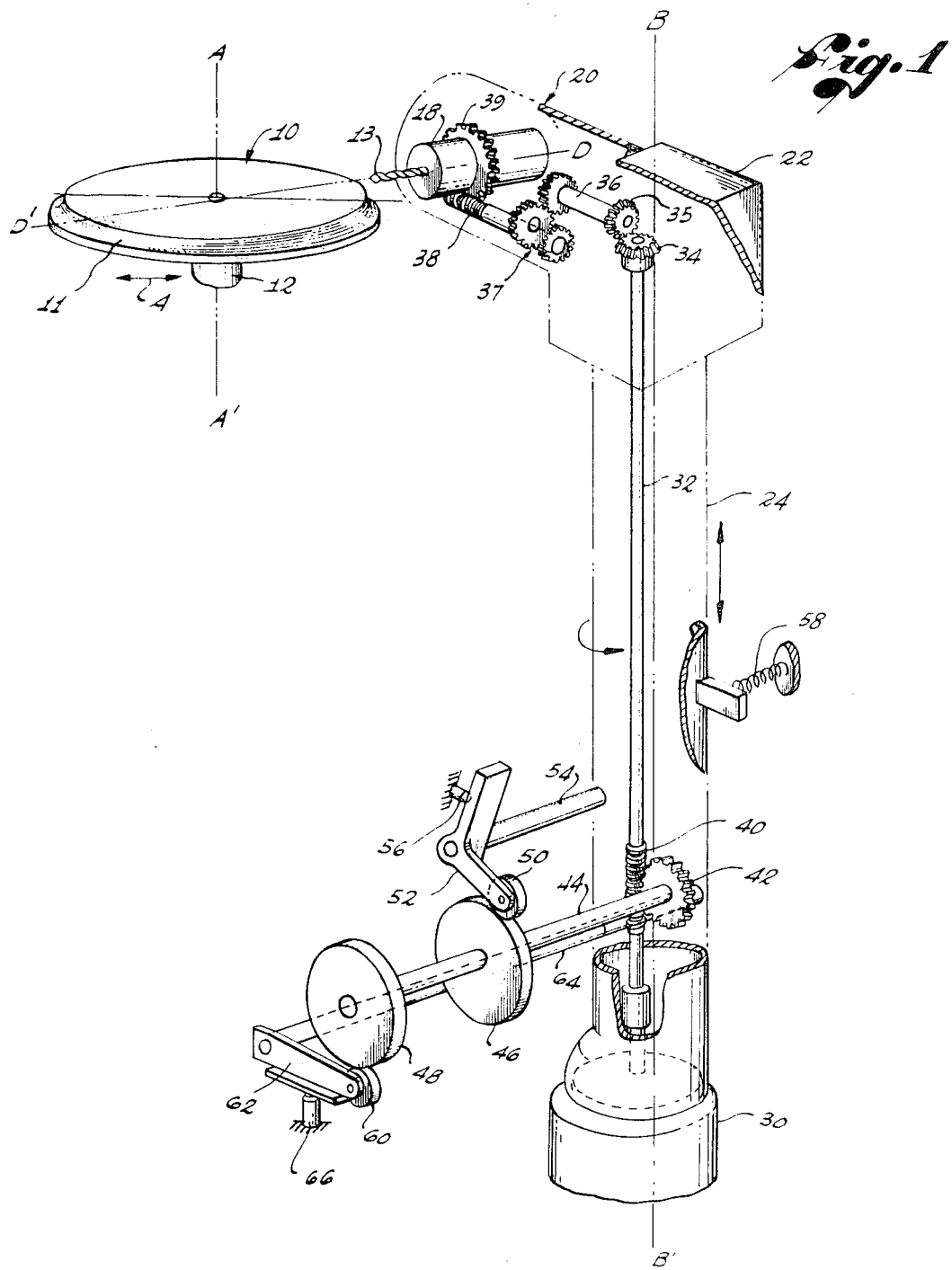
FIG. 1 is a schematic perspective view of a drill pointing machine in accordance with the invention.

A typical two-fluted curved lip twist drill is indicated in the drawings at $d$, and has a shank $s$, with the usual raised margin $m$, provided with point P having chisel edge $c$ and curved cutting lips $r$, in back of which are point surfaces L. The chisel edge may subsequently be modified, curved as by splitting, or otherwise, but any such procedure is an optional step in addition to the procedure of the present invention. The point is generally defined by a surface of revolution, whose generatrix is an arc in a diametral plane of the drill, struck about a center point $cp$ in the machine (FIGS. 3—5) displaced usually laterally off the longitudinal drill axis. The radius R of this arc may be, for example, but without limitation, three-quarters of the diameter of the drill. It may range say between 0.4 (or even somewhat less) and approximately 0.75 (or more) of the diameter of the drill. The point has two lips $r$, each contained within the surface of revolution, the profile along the lip, beginning at the chisel edge, with a straight line segment, merging with an arcuate curve (about the center point $cp$ of an arcuate segment $y$ of the grinding wheel) and the curved portion continuing to a juncture, preferably, and as shown, at somewhat less than tangency, with the front edge of the margin $m$, as may be understood best from FIG. 3. Cutting occurs all along the lip, from the chisel edge down to the point $m'$ where the lip merges with the margin. The point is ground with both axial and radial clearance, as explained in the introductory portion of the specification.

The present invention may be carried out by employing, as one example, a drill point grinding machine such as disclosed in U.S. Pat. No. 3,209,493 to Harold O. Houser, the only modifications required being special cam shapes, and synchronization, a novel shape on the grinding wheel, and a novel motion path onto, across, and off the grinding wheel, obtained by changed contouring and timing of the cams relative to one another. It is also found advantageous, although not essential, to make use of a slight fixed tilt of the drill axis relative to the plane of the grinding wheel. Accordingly, for simple disclosure of the grinding machine of the present invention, I show herein, in FIG. 1, a diagrammatic perspective corresponding to a figure in said aforesaid patent, from which the essentials of the machine may be understood. Reference may be had to the patent for a disclosure of suitable details.

In FIG. 1, a grinding wheel is shown at 10 and has a specially contoured, peripheral, concave or grooved grinding surface 11, described more particularly hereinafter. The grinding wheel is here shown as turning on a vertical axis A—A' on a rotatable drive shaft 12. In practice, the drive shaft is journaled in a device affording capability for fine horizontal adjustment of its position in directions toward and from the drill $d$ to be pointed, as indicated by the double-headed arrow A (see U.S. Pat. No. 3,209,493). The longitudinal axis D—D' of the drill bit is nearly or substantially horizontal, but preferably, however, slightly upwardly tilted, by about 10°, toward the grinding wheel, and while this axis D—D' may substantially intersect the grinding wheel axis, in order to aid in grinding axial relief, it, preferably, is at an angle of a few degrees, say 2° to 4°, from a straight line from the drill to the wheel axis A—A', the axis D—D' extending to the left of the axis A—A' as viewed from the drill bit. The drill is held by a drill holder 18 rotatably mounted on the axis of the drill in a drill support 20. It may be said broadly that the grinding wheel axis is at least near to containment in a plane through the drill axis. The support 20 is largely broken away in FIG. 1, and bearings and the like are omitted, for the sake of simplified disclosure of the components essential to the present embodiment of the invention. The outline of the omitted portions of the partially shown components is represented in dot-dash lines. Details are illustrated in U.S. Pat. No. 3,209,493.

The support 20 includes a housing 22 on the top of and projecting laterally from a column 24, which is in the nature of a hollow vertical shaft, and which will be understood to be mounted for oscillation about and reciprocation along a vertical axis B—B'. The drill holder 18 is in the extremity of the laterally extending portion of housing 22, and oscillation of column 24 swings the housing, and the drill holder and drill, toward and from the periphery of the grinding wheel, while vertical reciprocation of the column 24 moves the drill holder and drill vertically relative to the grinding wheel. These separate movements are made such that the drill point is raised above the grinding wheel, then moved downward into engagement with the grooved grinding surface 11, thence, in one illustrative practice of the invention, downwardly for a slight distance against the surface 11, thence both downward and laterally across i.e. along the profile of the surface 11, and is finally backed off the surface 11. Certain important refinements of this motion will be described hereinafter. The contour of the surface 11, described more specifically hereinafter, and the path of movement of the drill point, coordinated with a rotation of the drill on its longitudinal axis, generate the desired curved lip point with high precision.

The rotation of the drill on its axis and the cyclic oscillation and reciprocation of the column 24, are powered by an electric drive motor 30 mounted on the lower end of the column 24. The shaft of this motor is coupled, as shown in FIG. 1, to a vertical drive shaft 32 which extends upwardly through column 24 and into housing 22, where it drives, through bevel gears 34 and 35, a shaft 36, and a gear train 37, a worm gear 38 meshing with a worm wheel 39 on rotatable drill holder 18. The latter is thus constantly rotated by motor 30.

Shaft 32 carries a worm 40 meshing with a worm wheel 42 on a shaft means 44 journaled for rotation on its axis in bearings, not shown, supported by column 24. Shaft means 44 carries two cams, 46 and 48, contoured as later described.

Cam 46 engages a cam follower roller 50 carried by one arm of a bellcrank 52 pivotally mounted by means 54 on the column 24 to rock on an axis parallel with that of the shaft means 44. The other arm of the bellcrank 52 extends generally upwards and engages a fulcrum 56 fixed in the machine frame, not shown. When the high point or region on cam 46 engages roller 50, the bellcrank 52 reacts against fixed fulcrum 56, and a thrust is exerted through means 54 to swing the column 24 about its axis B—B' against a yielding restraining or return spring 58. When the high region on the cam passes beyond the roller 50, the spring 58 returns the column 24, so the column 24 is thus constantly oscillated by the cam 46 and spring 58 about axis B—B'. It will be clear that thereby the drill 13 in holder 58 is oscillated toward and from the grinding wheel, alternately making engagement therewith, and then receding.

Cam 48 engages a follower roller 60 on a lever 62 fixed on a horizontal shaft means 64 which is parallel with the axis of cams 46 and 48, and is journaled on column 24. This lever arm 62 engages a fulcrum 66 which is fixed to the machine frame. When the high point or region of cam 48 engages roller 60, the lever 62 rocks on fixed fulcrum 66, and so acts through shaft 64 to elevate column 24. The column subsequently, after passing off the high point or region on the cam, descends of its own weight. Thus, the drill holder and drill are alternately elevated and lowered relative to the grinding wheel.

The two cams 46 and 48 are contoured and synchronized to carry out the movements, dwells, and timing in accordance with the typical cam timing diagram of FIG. 2. The actual throws and dwells of the cams will depend in any given case upon the design of the particular machine, the diameter of the drill to be pointed, the material to be drilled, and the preferences of the user, all as will be understood by, and is within the capacity of, those skilled in the art.

Turning attention at this point to the grinding wheel, the contour of the grinding surface 11 is more particularly described as follows: Peripheral grinding surface 11, whose profile comprises the generatrix of the surface to be ground on the drill point, is a surface of revolution about the axis of the wheel, and is in the general nature of a groove or concavity sunk into the periphery of the wheel, preferably into its upper corner. The profile of the concave grinding surface 11, in the specific case here instanced (see FIG. 3), is a line composed of, first, an upper inclined straight line segment $x$, intersecting the flat, horizontal top surface of the grinding wheel, and making an angle $\alpha$ of substantially 20° with the vertical; second, a concave arcuate segment $y$, to which the segment $x$ is tangent, described about center point $cp$ at a radius R which in this particular example is greater than the radius of the drill to be pointed, and which may have a central angle of approximately 54°; and, third, a straight line segment $z$, tangent to the arcuate segment $y$ at the lower end of the latter, inclined downwardly in the direction radially outward of the wheel, and disposed at an angle between about 5° and 25°, in the illustrative case substantially 6°, to the shank of the drill, or 16° to horizontal. The preferred angle $\alpha$ may be determined by the expression $(180° - \frac{2}{3} - 10°$ and the present case, where $\alpha = 20°$ is therefore appropriate for a point angle of 120°. The drill shank, or axis, as heretofore mentioned, is preferably inclined at 10° to horizontal. The center $cp$ of the arcuate grinding segment $y$ will be seen to be laterally offset above the longitudinal axis of the drill, though this relation may not hold for modified practices of the invention, and the center $cp$ may in some cases actually be on the drill axis.

From the diagram of FIG. 2, which is typical for a ¼-inch diameter two-flute drill (shown to approximately 5x scale in FIGS. 3—5), it will be seen that the gear ratio between the cams 46 and 48 and the drill holder is such that the drill holder and drill rotate through 180° for 360° of rotation of cams 46 and 48. Thus, there is one 360° cam cycle for each of the two lips $r$ of the drill, the cams each revolving once for each half-revolution of the drill. In FIG. 2, graphs V and H represent ordinates of vertical and horizontal movements of the drill throughout 180° of drill rotation, and their ordinates thus represent and are proportional to the radii of cams 46 and 48, respectively, throughout 360° of cam rotation.

Operation, as represented in the diagram of FIG. 2, is as follows: Starting from an arbitrary reference point, 0° in the diagram, with the drill retracted, and at its high limit of vertical reciprocation, and with the drill point therefore out of engagement with the grinding wheel, during the first 60° of drill rotation, the drill is fed forwardly to its most advanced position and is started vertically downward.

Figure 3:
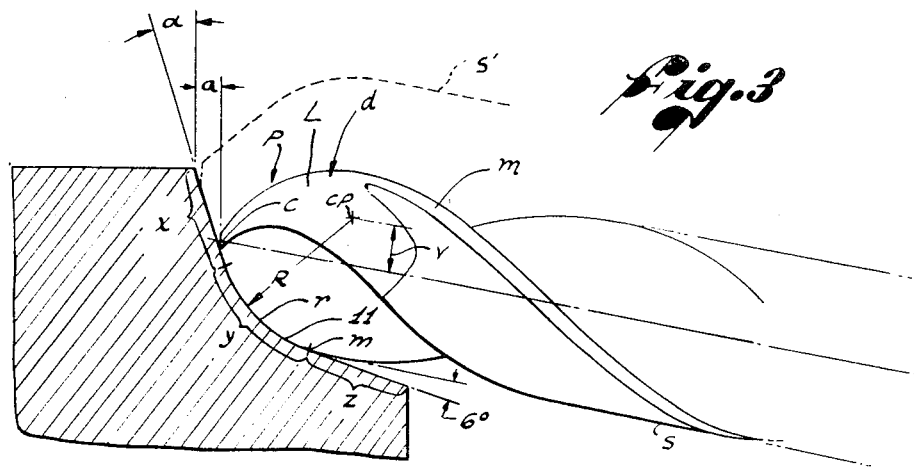
FIGS. 3, 4, and 5 are enlarged fragmentary and somewhat diagrammatic views showing successive positions of the drill and grinding wheel surface, and showing, with some exaggeration for the sake of clarity, the radial relief as ground during a grinding cycle.

At 60° of drill rotation, the drill point, moving straight down (at angle $\alpha$ to grinding wheel portion $x$), makes contact with a lower portion of grinding surface $x$, and with arcuate grinding surface $y$, having reached the position of FIG. 3. The drill is so positioned in the drill holder that at this position, a beginning edge area $g$ of a drill point surface L, adjacent the curved radial lip $r$, is in contact with the grinding surface. The area $g$ is shaded in FIG. 2 to show its general distribution. A chisel edge $c$ on the drill point is at this time at about 30° to the plane of the grinding wheel.

Figure 4:
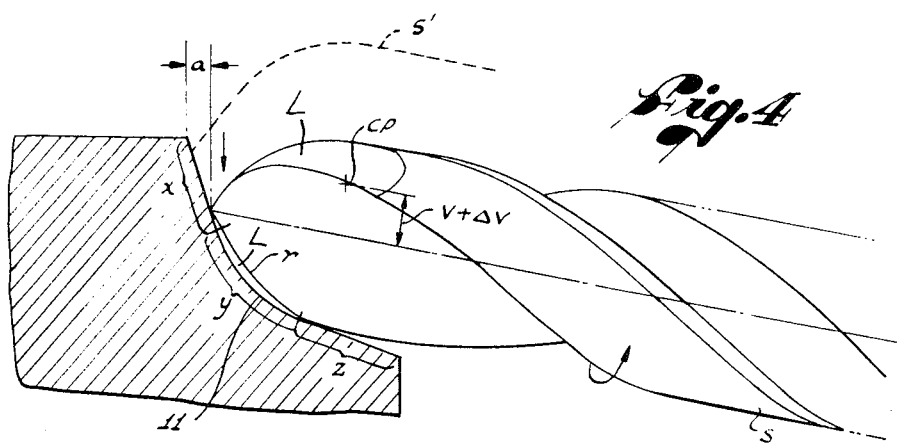
Figure 5:
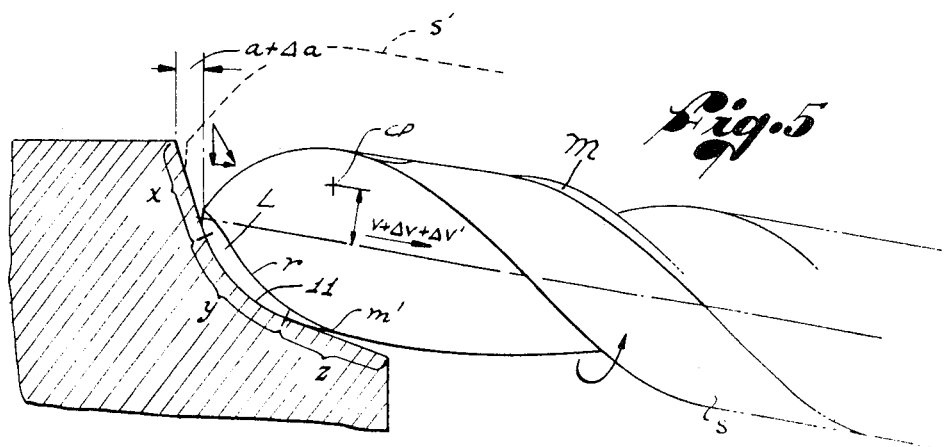

For the next 30° of drill rotation, the drill is held steady in its advanced position and is steadily lowered though, of course, at a very slow rate, so as to reach the slightly lowered position of FIG. 4, with the drill point turned through 30° (second position in FIG. 2) and the chisel edge $c$ horizontal, i.e., in a plane parallel with the grinding wheel. At this time, the area $g$ in contact with the grinding wheel has swept circumferentially around the point surface L to the middle position of FIG. 2. The chisel edge $c$ is ground during this period and is finished at its end; and owing to the vertical lowering of the drill and the generally diagonal disposition of the grinding wheel surface $x$ relative to the vertical, together with the rotation of the drill, axial clearance is being ground on the point back of the lip. Grinding of good axial clearance is also facilitated by the location of the longitudinal drill axis to the side of the grinding wheel axis, as mentioned hereinabove. Owing to the curvature of the grinding surface portion y, axial clearance is progressively less and less around the curve toward the shank. During this operation, radial clearance is also being ground on the point as the drill is lowered; and it will be seen that owing to the relationships involved, this radial clearance is greatest at the lower end of the grinding section y, where it is most needed, and is progressively less in the direction toward the drill tip, where it is needed less and less. Comparison of FIGS. 3 and 4 will reveal that a degree of radial clearance has been produced as the drill is lowered from the position of FIG. 3 to that of FIG. 4. FIGS. 3 and 4 illustrate this fact, in that, in FIG. 3, the drill axis is a distance $v$ from the grinding wheel arc center point $cp$, while in FIG. 4, this distance is increased to $v+\Delta v$. This means that a radial clearance equal to $\Delta v$ has been ground in the position of FIG. 4.

Beginning at the last described position (FIG. 4 and central position of FIG. 5) and continuing for the next 15° to 20° of drill rotation, the drill continues to move steadily but slowly downward, but now recedes horizontally, i.e., undergoes outfeed travel, as represented in FIG. 2, so that the drill point separates from the wheel in the region of the chisel edge at its tip. The continued downward and outfeed movements are proportioned such that while the chisel edged tip recedes from the grinding surface $x$, the point region below the separated tip continues to descend against the grinding wheel regions $y$ and $z$ in back of its tip region. The straight profiled portion $z$ of the grinding wheel surface will be seen to grind a substantially frustoconical surface area on the heel portion $h$ of the point surface L (FIG. 7). Thus, radial clearance toward the line of intersection with the shank continues to be ground. The position shown in FIG. 5, and the third position illustrated in FIG. 2, is reached preferably at 45° to 50° of drill rotation following initial contact with the grinding wheel. In this stage, the area $g$ in engagement with the grinding wheel is the radially outer trailing region of the land only. The drill having been lowered an additional distance $\Delta'$, its axis is now a distance $v+\Delta+\Delta'$ from the center point $cp$; and thus a radial clearance of $\Delta+\Delta'$ has been provided. Also, from the position of FIG. 4, to that of FIG. 5, the drill bit has been withdrawn or backed off horizontally by a short distance $a$. The important point to be observed here is that the drill point has been backed slightly off the steeper portion of the grinding surface, so that the previously ground chisel edge will not be further disturbed, while desirable radial clearance is still being ground on the radially outward region of the trailing portion of the heel or land of the drill.

Once the drill point is off the grinding wheel, it is retracted from the grinding wheel, and reelevated, in preparation for a repetition of the grinding pass, in the conventional way.

Attention is now directed to FIG. 3, showing the position in which the lip $r$ is against the grinding wheel, in its position of first contact. Note that the lip $r$ of the drill point, in the region adjacent the chisel edge, is being ground partly by the straight grinding wheel segment $x$, and partly by the curved segment $y$, while in the region of the juncture of the lip $r$ with the margin $m'$, lip $r$ is being ground partly by the curved segment $y$, and partly by the straight segment $z$ tangential to the latter. However, because the segment $z$ is at an angle to the side or shank of the drill, in this case 6°, the curve ground on the lip $r$ is tangential to the surface $z$, but some degrees inside of or less than tangential to the side of the drill. This is an advantage, since the cutting characteristics of the drill are found to deteriorate as true tangency between the cutting lip $r$ and the side, or margin, of the drill shank is approached.

It has been found beneficial in some cases to grind an extended length of straight line profile on the drill point from its tip to the point of tangential juncture with the section of curved profile. This is done simply by reducing the scale of the profile of the grinding wheel groove relative to the size of the drill. This may be done, of course, by increasing the size of the drill relative to the scale or dimensions of the profile of the grinding wheel groove. Such a larger scale drill $s'$ is illustrated in dashed lines in FIGS. 3, 4, and 5, and it will be obvious from inspection that there is a proportionately longer extent of straight line profile ground onto the drill point $s'$ as compared with the drill $s$ drawn to smaller scale relative to the grinding wheel profile.

A modification of the invention, which can sometimes be used, for example, when there is no problem as regards grinding away of a chisel edge during the last phase of the grinding operation, is to so shape the cam 46 as to sustain the infeed dwell position beyond the second or "finish chisel" position represented in FIG. 2, while the drill continues to lower to the third position represented in FIG. 3. In other words, and with reference to FIGS. 3, 4, and 5, the drill drops from the position of FIG. 3 to that of FIG. 4, and from that of FIG. 4 to that of FIG. 5, but is retracted horizontally (outfeed) only after reaching the position of FIG. 5. Thus, the drill drops vertically from the position of wheel contact to the position of separation from the wheel, without progressive withdrawal or outfeed, and then, beyond the third position of FIG. 2, is backed quickly off the wheel.

The process and machine as disclosed produce a superior, generated drill point of precision character.

I claim:

1. Apparatus for grinding on a twist drill a drill point of the type having cutting lips of convex curvature, and point surfaces of convex curvature following the lips and terminating in trailing edges comprising:

a drill holder for rotating a twist drill about a first axis, a grinding wheel rotatable on a second axis which is at least near to containment in a plane through the first axis, the grinding wheel having a peripheral groove including a peripheral grinding surface portion of concave profile having a beginning end and a terminal end, to which is joined, at the terminal end, a following grinding wheel surface portion whose profile at the juncture is substantially a tangential prolongation of said concave profile, drive means for rotating the drill holder on the first axis, and a cam actuated mechanism synchronized with the drive means for successively engaging the point surfaces of a rotating drill in the holder, alongside the lips thereof, with the grinding surface of concave curvature, and for moving the drill holder and drill so that the point surface being ground is progressively displaced relatively toward the grinding surface of concave profile in a direction which is transverse with respect to the first axis and at acute angle to the beginning end of the concave profile, which beginning end grinds the tip of the point, and for then moving the drill with a component of movement along the said direction combined with retraction of the drill point generally perpendicularly to the first mentioned direction of movement so that the tip of the point surface being ground is separated from the grinding surface portion of concave profile, and the following grinding surface portion acts with the concave grinding surface portion to complete the grind of the point surfaces of the rotating drill to the trailing edges thereof.

2. Apparatus according to claim 1, wherein the peripheral groove in the wheel has an initial grinding wheel portion of substantially straight profile tangentially joined to the beginning end of the grinding surface portion of concave profile, and which initially is engaged by the drill point as it engages against the grinding surface of concave profile.

3. Apparatus according to claim 2, wherein the first axis is inclined at an acute angle to a plane which is perpendicular to the second axis, the sense of the inclination being such as to reduce the angle between the first axis and the said following grinding wheel surface portion.

4. Apparatus according to claim 1, wherein the said following grinding wheel surface portion has a profile which has a substantially greater radius of curvature than the grinding surface of concave profile.

5. Apparatus according to claim 1, wherein the cam actuated mechanism effects the said movements of the drill holder and a drill in the holder cyclically a plurality of times for each revolution of the drill, 1 cycle per cutting lip.